United States Patent [19]

Laplume

[11] 3,868,476

[45] Feb. 25, 1975

[54] SYSTEM FOR LOCATING AND TRANSMITTING SELECTED IMAGES

[75] Inventor: Jacques Laplume, Le Plessis Robinson, France

[73] Assignee: Societe D'Etudes Techniques Et D'Entreprises Generales (Sodeteg), Le Plessis Robinson, France

[22] Filed: Feb. 7, 1973

[21] Appl. No.: 330,262

[30] Foreign Application Priority Data

Feb. 18, 1972 France .............................. 72.005509

[52] U.S. Cl. ......... 178/6, 178/DIG. 1, 178/DIG. 22, 353/27

[51] Int. Cl. .......................................... G03b 23/08

[58] Field of Search... 178/DIG. 22, DIG. 1, DIG. 2; 179/100.3 B; 352/101; 353/27, 25; 350/133, 143; 340/336, 173 LT, 173 LM

[56] References Cited

UNITED STATES PATENTS

| | | | |
|---|---|---|---|
| 2,295,000 | 9/1942 | Morse | 178/DIG. 22 |
| 2,296,141 | 9/1942 | Brown et al. | 352/101 |
| 3,030,441 | 4/1962 | Nemeth | 178/DIG. 22 |
| 3,050,579 | 8/1962 | Nash et al. | 178/DIG. 22 |
| 3,098,119 | 7/1963 | Lemelson | 178/6.6 |
| 3,401,398 | 9/1968 | Lichtenstein | 346/107 |
| 3,443,866 | 5/1969 | Lucas | 352/101 |
| 3,539,715 | 11/1970 | Lemelson | 178/6 |
| 3,609,226 | 9/1971 | Thompson | 178/6 |
| 3,612,676 | 10/1971 | Ooba | 353/27 |
| 3,728,808 | 4/1973 | Rieth | 340/336 |

*Primary Examiner*—Howard W. Britton
*Assistant Examiner*—Michael A. Masinick
*Attorney, Agent, or Firm*—Karl F. Ross; Herbert Dubno

[57] ABSTRACT

A rotating information carrier, such as a drum or an endless conveyor, holds an orthogonal array of microfilm frames which can be individually transluminated by light from one or more sources inside the carrier aligned with respective television cameras on the outside, each camera and light source being jointly movable parallel to the axis of rotation (here vertical) or being otherwise optically alignable with selected rows of frames by means of a reversible drive motor. Each frame has an axial coordinate *z*, counting the number of rows, and a peripheral coordinate *t*, counting the number of files parallel to the axis, which are respectively marked on a fixed vertical scale and on a peripheral carrier track coacting with respective photoelectric sensors. The first sensor, elevatable with an associated camera, transmits a first counting code to a first comparator receiving an identifying *z*-code from a remote selector such as a keyboard positioned next to a television receiver linked to the corresponding camera; upon coincidence of the two codes, the drive motor is arrested. The second, fixedly positioned sensor transmits a second counting code to a second comparator receiving an identifying *t*-code from the same keyboard. The second comparator triggers a pulse generator for activating the camera, this normally inhibited pulse generator being enabled by an unblocking signal from the first comparator indicating that the camera has reached the desired vertical position.

18 Claims, 6 Drawing Figures

SYSTEM FOR LOCATING AND TRANSMITTING SELECTED IMAGES

FIELD OF THE INVENTION

The present invention relates to a system for locating selected image frames from a number of such frames and transmitting their contents to a remote location.

BACKGROUND OF THE INVENTION

The requirement for information of all kinds has led to the development of a card-index system which, in the form of images, contains a multiplicity of cards which are liable to be examined by several persons simultaneously, often within a very short time.

It is further known to store a large number of documents in the form of microcards or microfilms, each document page occupying, for example, an area of one square centimeter or even substantially less.

The problem which arises, therefore, is not the storage of documents, but the manner in which persons utilizing the card index can conveniently retrieve the information contained therein, without having to wait for the selected document or documents and without physical effort.

The simplest way of getting access to the documents stored in the manner hereinbefore described, is to manually extract the appropriate microfilm from the index system and place it in an optical viewer. However, this procedure is a slow one, especially if the viewer is at some distance from the index, the time involved in carrying the microfilm being added to that needed to locate it in the index.

To reduce this time, it has been proposed that the viewer be replaced by a television screen connected by a transmission line to a television camera set up in proximity to the index. In this case, it is simply the time of carrying the microfilm from the index to the viewing station which is being saved. Moreover, each document must still be read individually.

It is further possible to automate the transfer of the film from its storage position to the point at which it is read. A mechanical conveyor system has been proposed for this purpose. However, if the number of microcards is large, the time of transfer required by the mechanical conveyor is no longer negligible and if for example several pages of one document have to be consulted, the person seeking information will have to wait several seconds upon each shift from one page to the next.

To overcome this drawback, it has been proposed that there be successively presented before the camera all the pages of the document and these images be then stored in an erasable memory assigned to each reading station. However, this method is expensive.

OBJECT OF THE INVENTION

The object of the present invention is to provide improved means for locating documents placed in a micro index and transferring them to a remote location with avoidance of the aforesaid drawbacks.

SUMMARY OF THE INVENTION

In accordance with this invention I provide, on a rotatable carrier such as a drum or an endless conveyor, a multiplicity of advantageously transparent image frames of uniform dimensions positioned in an orthogonal array with rows transverse and files parallel to the axis of carrier rotation. Thus, each frame is identifiable by two coordinates, namely a first coordinate counting the number of rows from a predetermined reference row (e.g. the top row in a system with a vertical axis of rotation) and a second coordinate counting the number of files from a predetermined reference file. At least one television camera, operatively coupled to an associated display device such as the screen of a television receiver, is axially movable on a stationary support which may comprise two parallel columns, one for a light source and one for a camera pick-up element synchronized with that source for joint axial displacement under the control of a reversible drive motor. The pick-up element may comprise a lens mounted directly in front of the camera, in which case both the lens and the camera move along the support, or a reflector directing collimated light rays from the confronting image axially onto the stationary camera. Similarly, the light source may comprise a lamp movable along the support or a stationary generator of an axially directed, collimated beam trained radially by a reflector upon an image to be illuminated. With the light source positioned inside the carrier and the pick-up element disposed outside the carrier, the light rays from the source transluminate the image.

A selector near the display device, such as a keyboard, affords a choice of correlated identifying codes for an image to be reproduced, i.e., a first identifying code marking the row and a second identifying code marking the file of a selected image. These identifying codes, which may be stored in respective registers, are transmitted to a first and a second comparator also receiving, from associated sensors, a first and a second counting code marking the current axial position of the pick-up element and the current rotary position of the carrier, respectively. As long as the first counting code does not match the first identifying code, the first comparator generates a control signal for the drive motor to displace that pick-up element (with or without the camera) until it confronts the selected row; at this point, the motor is stopped and an unblocking signal is sent to a previously inhibited pulse generator which activates the camera in response to a trigger signal emitted by the second comparator upon detection of a match between the second counting and identifying codes. The activation of the camera may involve the momentary energization of the associated light source.

The solution offered by the invention has the advantage of considerably reducing the various times needed to locate the document and transfer it to the view position, in prior systems these times tended to be prohibitively long. In fact, in the case of the device in accordance with the invention the access time to a document page can easily be reduced to less than one second.

Another advantage of the device in accordance with the invention is the possibility it offers of multiplying, without any difficulty at all, the number of stations at which the camera apparatus can be set up, besides enabling several viewers to have simultaneous access to the index, irrespective of whether such persons wish to consult the same image or different images.

BRIEF DESCRIPTION OF DRAWING

The invention will be better understood from a consideration of the accompanying drawing in which.

DETAILED DESCRIPTION.

Figure 1:
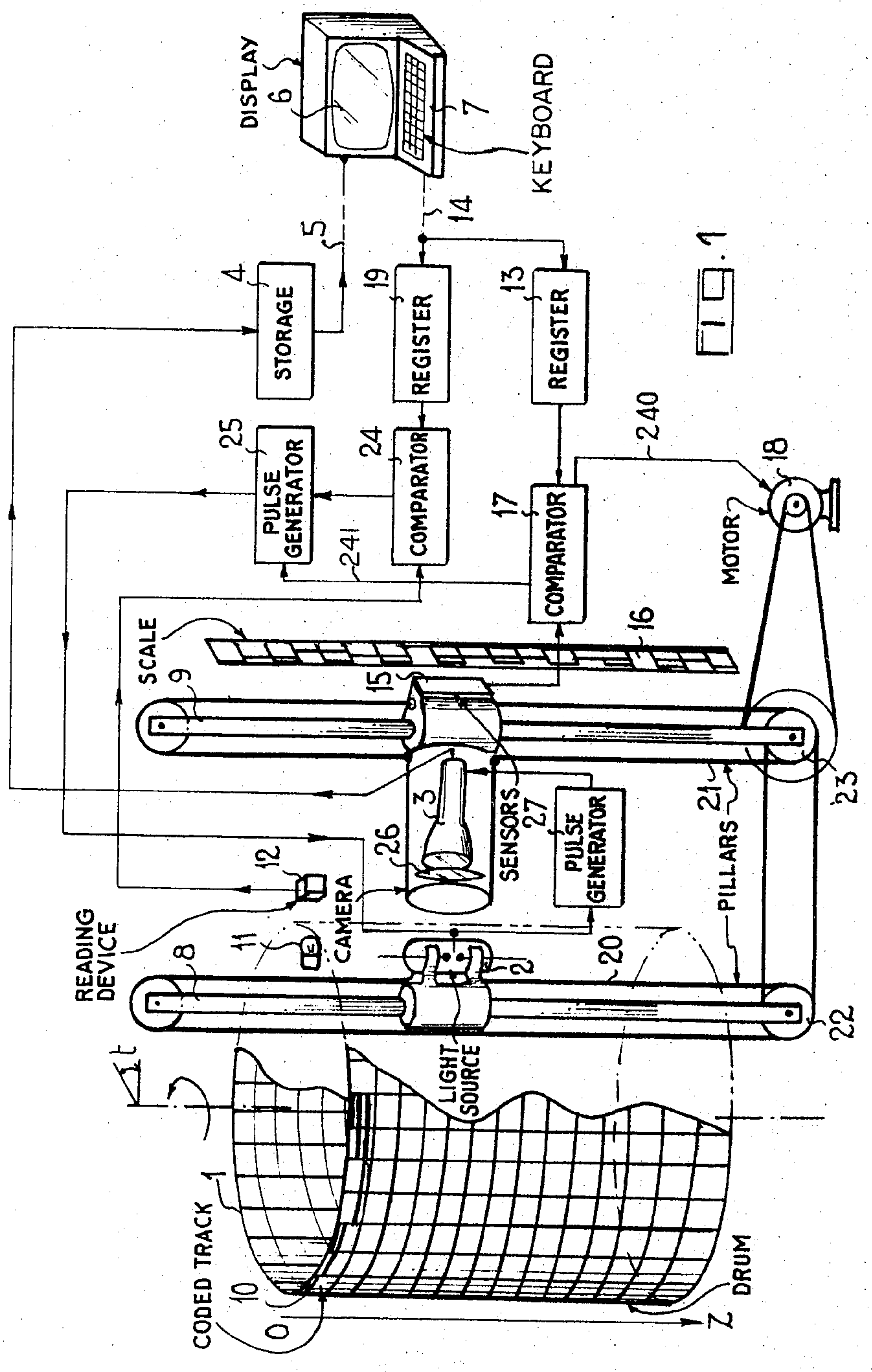
FIG. 1 is a diagrammatic representation of a system according to my invention for locating and transmitting images, serving one user only.

FIG. 1 illustrates the a system for locating, and transmitting to a remote location, selected images in accordance with the invention, the utilization of this system being limited, however, to a single person.

The microfilmed documents to be visually reproduced are distributed in rows one above the other on a lateral wall of a rotating element, in the present illustration a hollow, transparent cylindrical drum 1 rotating about its axis which has been assumed to be vertical. The position of a microfilmed image is defined by two cylindrical coordinates, i.e., an elevation $z$ counting the number of rows from a reference level 0 and an azimuthal coordinate $t$ counting the number of files from a reference radius.

It is obvious that the dimensions of the images in the drawing have been exaggerated. In one practical realization, cylinder diameter and height are on the order of 1 meter, hence the developed area of the cylinder is on the order of 3 square meters. The dimensions of one page of a microfilmed document are on the order of 1 × 1 cm, that is to say an area on the order of one $cm^2$; a drum of this size, therefore, can accommodate several tens of thousands of pages.

The transmission of a microfilmed page to a remote viewing location is carried out by means of a device comprising a light source 2, a television camera 3, an image memory 4, a transmission cable 5, and a television screen 6. The screen is equipped with a keyboard 7 which makes it possible to designate the requisite image by typing a code which defines the coordinates $z$ and $t$ of the image, the first digits corresponding to the coordinate $z$, the last ones to coordinate $t$, these coordinates thus identifying the position of the selected frame in the orthogonal array.

As FIG. 1 shows, the light source 2 and the television camera 3 are mounted on columns 8 and 9 along which they can slide; a reversible drive motor 18 and pulleys 22 and 23, interconnected by chains or cables and carried respectively the two columns, make it possible to displace light source and camera together.

Thus, striking the first digits of the code on the keyboard 7 triggers simultaneous vertical displacement of the light source 2 and the camera 3, which at all times remain opposite one another, along the guide columns 8 and 9. It is also possible to use screw-threaded supporting rods which, by rotating about their own axes, longitudinally displace nuts fixed to the light source and the camera, a conventional tongue-and-groove arrangement preventing any rotation of the nuts themselves. The selected elevational identifying code is recorded in an electronic register 13, connected to the keyboard 7 by a transmission line 14. The vertical position of the camera, for example, is marked at any instant by means of photoelectric sensors 15 fixed to the camera, and positioning to read a counting code printed on a vertical scale 16. This counting code is compared continuously with the identifying code stored in the register 13. When they are identical, a comparator 17 trips a cut-out switch so that the motor 18 stops. The counting code can also be printed upon a disc driven by the motor itself.

A device of the same kind is utilized to mark the instant when the desired photomicrograph appears, during a cycle of rotation of the drum 1, between the light source and the camera. For example, an optical code track may be printed along the upper edge 10 of the drum. This track is illuminated by an auxiliary lamp 11 and ready by a code reader 12. The identifying code defining the coordinate t of the desired photomicrograph has been entered in a register 19 connected to the keyboard 7 by the transmission line 14. When a comparator 24 detects coincidence between the contents of the resister 19 and the signal furnished by the reader 12, it triggers a pulse generator 25 which causes the light source 2 to light up for a very short time. The generator 25, however, is not triggerable until the comparator has furnished a command to stop the motor 18, this command being symbolized by a connection 240.

In practice the duration of illumination should be less than a few microseconds in order to avoid the blurring due to displacement of the photomicrograph during illumination. Thus, if it is assumed that the drum rotates at a rate of one revolution per second and if the diameter of the drum is around 1 meter, the speed of displacement of the images will be 314 cm/s. If the width of an image is one centimeter, the time of transit of an image will be 1/314 second or 3.2 ms. If a resolving power of 2,000 points is to be obtained, then, during the period of illumination, the image should not shift by more than 0.5 thousandths of its width. This condition determines the duration of the illumination period, which should be no more than 1.6 microseconds.

Comparator 17 (or 24) consists for instance of a set of AND gates. In a known manner, each gate checks for a coincidence between each bit of the code stored in register 13 (or 19) and a corresponding bit of the same numerical value in the code which is read by the sensing means 15 (or 12).

Another AND gate is connected to all the aforementioned AND gates. The output of this latter gate is the output signal of the respective comparator.

As has been indicated above, the output signal of comparator 24 triggers the pulse generator 25, provided the light source 2 is at the selected elevation 2. As soon as this condition is fulfilled, comparator 17 delivers via a lead 241 on unblocking signal to pulse generator 25 for rendering same triggerable by the comparator 24. Thus, as indicated in FIG. 1, the comparator 17 has two separate outputs controlling the motor 18 and the pulse generator 25. The latter signal, on lead 241, is produced when the counting code read by the sensing means 15 is identical with identifying the code entered in register 13.

The output of comparator 17 which controls motor 18, i.e. the signal on lead 240, is zero upon a coincidence between the codes considered, its polarity or phase angle of this central signal varies with the sign of the difference between the numerical values of the codes. This result is obtained with the aid of conventional means, used in electronic computers for instance, for determining whether a certain value is greater or smaller than another.

It is possible for instance to compare successively homologous bits of both codes, i.e. the counting code (a) read by the sensing means 15 and the identifying code (b) stored in register 13, beginning with the bits of highest weight. The comparison may be achieved by means of two logical circuits whose truth tables are as follows:

| b/a | 0 | 1 |
|---|---|---|
| 0 | 0 | 1 |
| 1 | 0 | 0 |

| b/a | 0 | 1 |
|---|---|---|
| 0 | 0 | 0 |
| 1 | 1 | 0 |

The first circuit delivers a signal when $a = 1$ and $b = 0$ and drives the motor 18 in a given sense. The second circuit delivers a signal when $a = 0$ and $b = 1$ and drives the motor 18 in the opposite sense. Obviously the sense of rotation of the motor is chosen so as to reduce the difference between the between the counting code read sensor 15 and the identifying code registered in store 13.

When these codes are identical with one another, all the logical circuits of comparator 17 deliver a zero signal and motor 18 stops.

Sources capable of producing illumination times of 1.6 microseconds are well known. It is possible, for example, to use a gas flash bulb, controlled by an auxiliary trigger electrode, to which the voltage coming from the pulse generator 25 is applied. Also, a laser semiconductor can be used, a d-c source equipped with a Kerr cell, or any other known device which produces the same result.

The tolerance for the accuracy of triggering of the light source is much less stringent. A delay in triggering is translated into terms of lateral frame error in the image displayed upon the television screen, the frame error corresponding to the displacement experienced by the photomicrograph during the delay time. In practice, a frame error of 5 percent of the image width is readily acceptable, i.e. in the case of photomicrographs 10 mm wide, a displacement of 0.5 mm. At a peripheral speed of the drum of 3,140 mm per second, this displacement corresponds to a duration of 0.5/3,140 sec. or around 160 microseconds. However, substantially better accuracy can be obtained without any difficulty.

The camera 15 is of the intergrating type, that is to say the current produced during the scanning depends solely upon the integrated photon flow intercepted by each element of the photosensitive layer and not upon the instantaneous illumination at the time of scanning. The vidicon camera, in particular, is of this character. During the time of illumination, a lens 26 forms upon the photosensitive layer of the camera an image of the photomicrograph which locally modifies the potential of the layers as a function of the intensity of illumination of each point. The ignition pulse for the light source triggers a pulse generator 27 which unblocks the scanning beam of the camera during the scan of an image. The video signal coming from the camera is registered in the memory 4, the latter being for example a storage tube or a magnetic disc. The signal thus stored is periodically read at the rate required to prevent scintillation on the television screen 6.

Generally, successive pages of one and the same document are photographed side by side on one and the same horizontal section of the cylindrical drum 1. Consequently, if the user desires to consult one of the next pages, it is unnecessary to change the vertical position of the light source and camera. It is merely necessary to change the code of the angular coordinate *t* and the new image appears on the screen 6 in less than a second which, in the example chosen, is the period of revolution of the drum. If it is desired that the index should be accessible independently to n different people, then it is merely necessary to distribute n identical read out devices, each like that already described, along the periphery of the drum. The lateral size of the light source and the camera can be less than 5 cm. Consequently, around a drum 314 cm in circumference it is possible to accommodate about sixty devices of this king which enable the same number of users to have mutually independent access to one and the same index, However, it should be ensured that the light emitted by one of the light sources cannot affect the other cameras.

Figure 2:
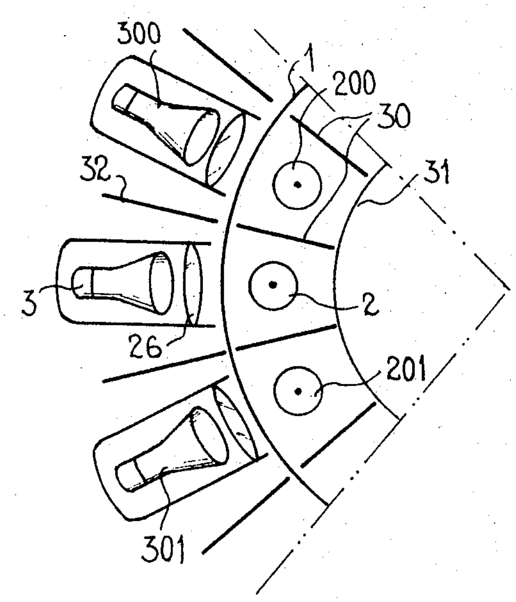
FIG. 2 is a fragmentary view of a partial modification of the apparatus shown in FIG. 1, designed for simultaneous utilization by several users.

In FIG. 2, several cameras 3,300,301 are distributed along the periphery of the drum 1. Opposite each camera there is an associated light source 2,200,201. These sources are isolated from one another by screens 30, 31, 32.

Figure 3:
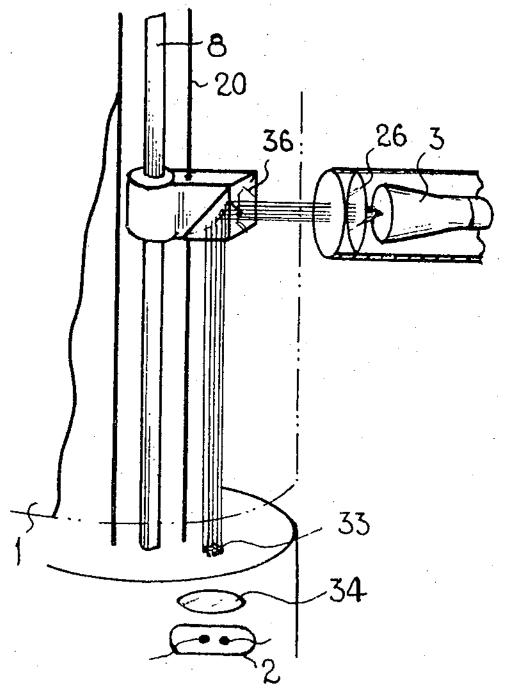
FIGS. 3 and 4 are views similar to FIG. 2, illustrating other partial modifications of the apparatus obviating the need for displacement of lamps and cameras.

It may happen that the ignition of the light sources, by induction, introduces parasitic signals into the camera and the associated low-level circuits. A simple method of combatting this kind of risk consists in assembling all the light sources and associated pulse generators at fixed stations in a shielded compartment located above or below the drum in a manner shown in FIG. 3. An opening 33 with a grill across it is formed opposite each light source in order to vertically direct a light beam whose rays are made parallel by a collimating lens 34. A totally reflecting prism 36 or mirror, sliding along the column 8, directs the light beam horizontally onto the wall of the drum in the direction of the camera. The light beam can also be directed to a position opposite the selected photomicrograph by means of a light conductor constituted by optical fibers.

Figure 4:
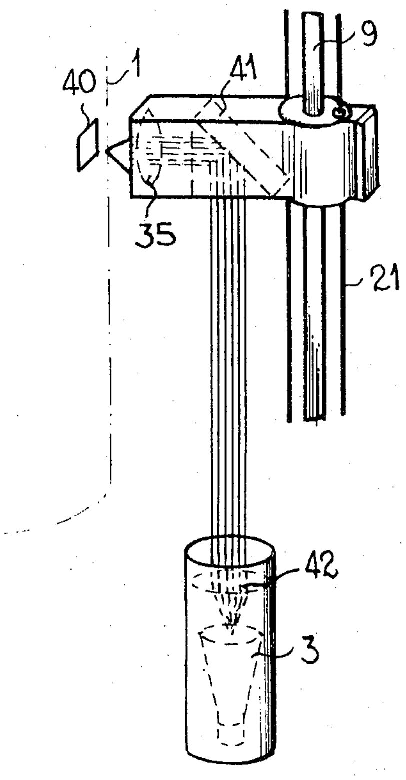

Again, the television camera itself can be arranged at a fixed station and the light beam directed toward it, through the photomicrograph by translumination as discussed hereinbefore, by an axially displaceable pickup element. FIG. 4 illustrates an embodiment of this kind. A lens 35 supplies a collimated beam focusing at infinity an image of a confronting photomicrograph 40. The horizontal light beam collimated by the lens is deflected downwardly by a totally reflecting prism 41 and is then picked up by a lens 42 which projects the image upon the photosensitive layer of the camera 3.

In the aforedescribed embodiment of my invention, the moving element carrying the photomicrographs is a drum rotating in from of one or more television cameras. Within the scope of the present invention it is also possible to design the moving element as an endless a conveyor belt carrying photomicrographs which, as in the foregoing example, pass before television cameras.

Figure 5:
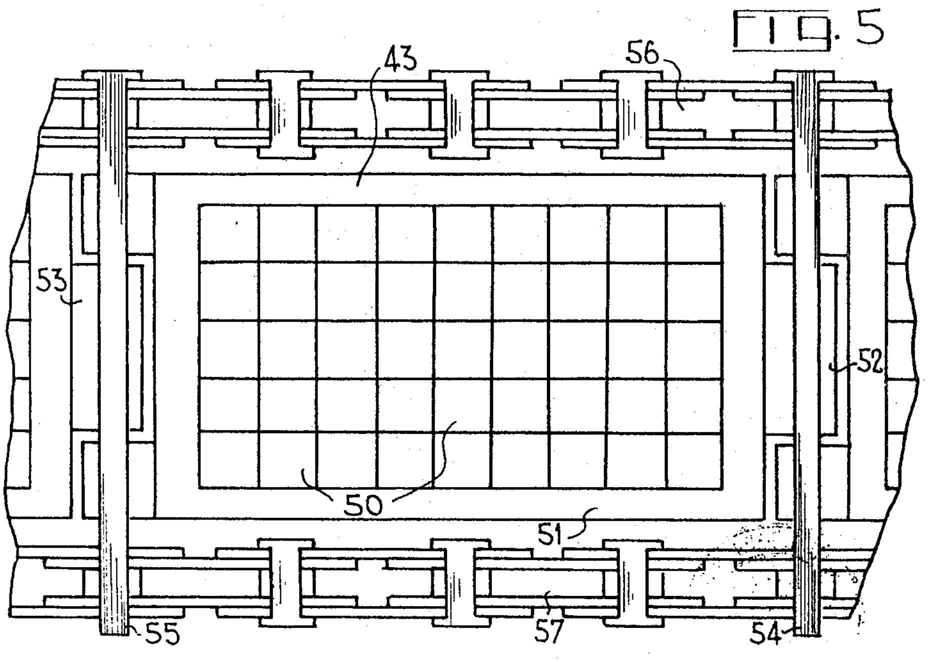
FIGS. 5 and 6 are elevation and a perspective view illustrating a further embodiment of the invention.
Figure 6:
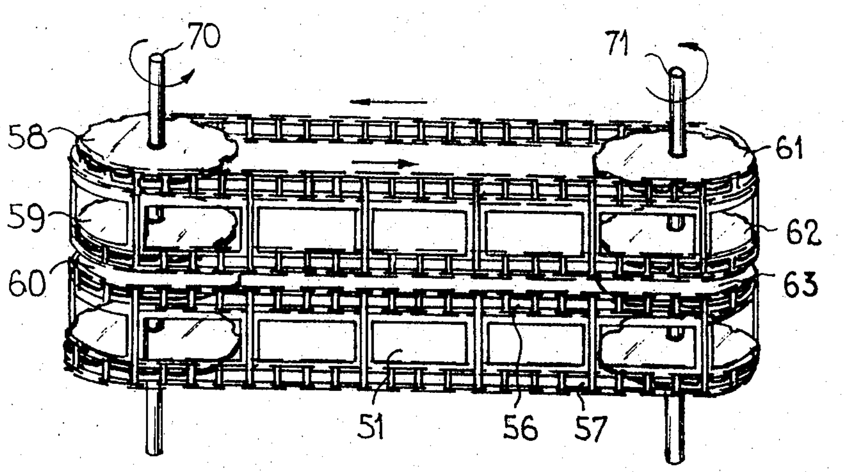

FIGS. 5 and 6 illustrate an embodiment of this nature. The plan view of FIG. 5 illustrates in a detailed manner a part of the conveyor with the photomicrographs which it carries, whereas FIG. 6 illustrates the complete conveyor with its drive sprockets.

FIG. 5 illustrates an endless band 43 forming part of the conveyor. It is constituted by a set of frames 51 articulated to one another and to a pair of endless chains 56, 57. On the frames 51, which can be of metal or plastic, the photomicrographs are fixed for example by pasting. Each frame is coupled to its neighbor by a hinge 52, 53 articulated about pins 54, 55 secured to the chains 56, 57. These hinges can be used at certain locations to replace the pivot pins of the chain links.

As FIG. 6 shows, several endless bands such as those described with reference to FIG. 5 can be disposed one below the other, thus constituting the conveyor belt which carries the photomicrographs and passes before the non-illustrated television cameras. Also, in FIG. 6, the chains 56, 57 can be seen to mesh with the sproket wheels 58, 59, 60, 61, 62, 63 fixed to spindles 70 and 71.

One of the spindles, e.g. spindle 70, is driven at constant speed by a motor not shown. The television cameras and the associated lighting tubes are arranged at either side of the conveyor in the region where the frames 51 execute a translatory movement. These cameras and light sources have not been shown but are essentially similar to elements 2, 3 of FIG. 1.

An advantage of this kind of apparatus, compared with a system having a rotating drum, is that it facilitates the updating of the index by the substitution of certain groups of photomicrographs without any risk of interference with others. To this end, it is merely necessary to open the conveyor band by extracting the pins 54, 55, withdrawing the frame 51 replacing it by another frame carrying the new images, and then replacing the pins 54, 55.

Alternatively, the frames 51 could be permanently assembled on the chains 56, 57 and equipped to receive replaceable microcards. The microcards could be, for example, fixed to the frame by means of clips. This obviates the need to open the conveyor band when it is desired to substitute a group of photomicrographs for another. Naturally it is not mandatory to utilize two chains for each conveyor band. The same chain 57 could for example, be common to two adjacent bands. In a limiting case, it might be sufficient to restrict the arrangement to one chain at the top and one chain at the bottom of the conveyor.

What is claimed is:

1. A system for locating and transmitting selected images from a number of image frames of uniform dimensions, comprising:

a carrier rotatable about an axis, said carrier having mounted thereon a multiplicity of image frames in an orthogonal array with rows transverse and files parallel to said axis, each image frame being identifiable by a first coordinate counting the number of rows from a predetermined reference row and a second coordinate counting the number of files from a predetermined reference file;

stationary support means extending parallel to said axis;

at least one television camera provided with pick-up means axially movable along said support means;

drive means coupled with said pick-up means for axially moving same along said support means;

display means remote from said camera operatively coupled thereto for reproducing an image confronting said pick-up means;

selector means adjacent said display means for generating a first and a second identifying code respectively marking said first and said second coordinate of an image to be reproduced;

first sensing means coupled with said pick-up means for generating a first counting code marking the axial position of said pick-up means;

second sensing means coacting with said carrier for generating a second counting code marking the rotary position of said carrier relative to a predetermined reference position;

first comparision means connected to said selector means and to said first sensing means for receiving therefrom said first identifying and counting codes and for generating a control signal for said drive means to move said camera into an axial position in which said first counting code matches said first identifying code, said first comparison means emitting an unblocking signal in the presence of such a match while arresting said drive means;

second comparison means connected to said selector means and to said second sensing means for receiving therefrom said second identifying and counting codes and for generating a trigger signal upon detecting a match thereof; and activating means for said camera connected to both said first and said second comparison means for operation in the presence of said unblocking signal and in response to said trigger signal to reproduce on said receiver an image confronting said pick-up means.

2. A system as defined in claim 1 wherein said drive means comprises a reversible motor, said first comparison means including logical circuitry for modifying said control signal according to the relative magnitudes of two numerical values respectively assigned to said first identifying and counting codes for operating said drive means in a sense depending upon the sign of the difference of said numerical values.

3. A system as defined in claim 1, further comprising first register means inserted between said selector means and said first comparison means for storing said first identifying code, and second register means inserted between said selector means and said second comparison means for storing said second identifying code.

4. A system as defined in claim 1, further comprising memory means inserted between said camera and said display means for storing a replica of an image confronting said pick-up means during operation of said activating means.

5. A system as defined in claim 1 wherein said pick-up means comprises a lens mounted in front of said camera on said support means for joint axial displacement with said camera.

6. A system as defined in claim 1 wherein said camera is fixedly mounted adjacent said support means, said pick-up means comprising a reflector on said support means training collimated light rays from a confronting image upon said camera.

7. A system as defined in claim 1 wherein said first sensing means comprises a fixed code bearer parallel to said axis and an axially displaceable photoelectric transducer confronting said code bearer.

8. A system as defined in claim 1 wherein said second sensing means comprises a code track extending peripherally around said carrier and a fixed photoelectric transducer confronting said code track.

9. A system as defined in claim 1 wherein said selector means comprises a keyboard.

10. A system as defined in claim 1 wherein said image frames are hingedly interconnected into a plurality of parallel endless bands, said carrier comprising at least one endless chain paralleling said bands.

11. A system as defined in claim 10 wherein said chain and an adjacent one of said bands are provided with common hinge pins.

12. A system as defined in claim 1 wherein said camera is provided with a light source individual thereto, said activating means being operative to energize said light source.

13. A system as defined in claim 12 wherein said support means comprises a pair of parallel supports for said pick-up means and said light source, respectively, said drive means being provided with transmission means for synchronously displacing said pick-up means and said light source.

14. A system as defined in claim 13 wherein one of said supports is disposed within said carrier, the other of said supports being disposed outside said carrier, said images being transparent for translumination by the light of said source.

15. A system as defined in claim 1, comprising at least one other television camera provided with pick-up means axially movable along said support means independently of the first-mentioned pick-up means.

16. A system as defined in claim 15 wherein said cameras are provided with individual light sources and with shield means optically isolating said light sources from each other.

17. A system as defined in claim 16 wherein said light sources include generators of axially oriented collimated beams and deflecting means for directing said beams radially onto frames of respective files.

18. A method of locating and transmitting selected images from a number of image frames of uniform dimensions, comprising the step of:

assembling a multiplicity of said frames on a common carrier for continuous rotation about an axis, in an orthogonal array with rows transverse and files parallel to said axis in which each image frame is identifiable by a first coordinate counting the number of rows from a predetermined reference row and a second coordinate counting the number of files from a predetermined reference file;

optically aligning a television camera with a selected row of said array identified by said first coordinate;

monitoring the count of said files ascertaining the passage thereof through an angular position identified by said second coordinate in which a selected frame of the selected row is optically aligned with said camera;

momentarily activating said camera upon passage of said carrier through said angular position;

storing an output of the activated camera for visual reproduction of the selected image at a remote point; and inhibiting the activation of said camera during optical realignment thereof with the rows of said array.

* * * * *